US008989007B2

(12) United States Patent
Raaf et al.

(10) Patent No.: US 8,989,007 B2
(45) Date of Patent: Mar. 24, 2015

(54) LOAD BALANCING IN RELAY-ENHANCED ACCESS NETWORKS

(75) Inventors: Bernhard Raaf, Neuried (DE); Simone Redana, Munich (DE); Oumer Teyeb, Aalborg (DK); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 164 days.

(21) Appl. No.: 13/146,251

(22) PCT Filed: Jan. 30, 2009

(86) PCT No.: PCT/EP2009/051072
§ 371 (c)(1),
(2), (4) Date: Jul. 26, 2011

(87) PCT Pub. No.: WO2010/086023
PCT Pub. Date: Aug. 5, 2010

(65) Prior Publication Data
US 2011/0280127 A1    Nov. 17, 2011

(51) Int. Cl.
*H04J 1/16* (2006.01)
*H04W 28/08* (2009.01)
(Continued)

(52) U.S. Cl.
CPC ............. *H04W 28/08* (2013.01); *H04L 45/125* (2013.01); *H04L 45/38* (2013.01); *H04L 47/125* (2013.01);
(Continued)

(58) Field of Classification Search
CPC ..... H04W 48/17; H04W 48/18; H04W 48/20; H04W 72/02; H04W 72/04; H04W 72/0426; H04W 72/0486; H04W 84/02; H04W 84/18; H04W 84/20; H04W 84/22; H04W 88/005; H04W 88/08; H04W 88/14; H04W 88/16; H04W 92/02; H04W 92/04; H04W 92/045; H04W 92/06; H04W 92/10; H04W 40/04; H04W 40/12; H04W 40/14; H04W 40/16; H04W 40/20; H04W 40/22; H04L 12/2858; H04L 12/2859; H04L 12/2861; H04L 12/2863; H04L 12/2865; H04L 12/2867
USPC ......... 370/468, 465, 536, 235, 366, 542, 508, 370/503, 246, 315
See application file for complete search history.

(56) References Cited

U.S. PATENT DOCUMENTS

2006/0133328 A1*  6/2006  Levendel et al. ............... 370/338
2007/0180320 A1*  8/2007  Poyhonen et al. ............... 714/31
(Continued)

FOREIGN PATENT DOCUMENTS

WO    WO 2008/024057 A2    2/2008

OTHER PUBLICATIONS 802.16-2004, "IEEE Standard for Local and Metropolitan Area Networks—Part 16: Air Interface for Fixed Broadband Wireless Access Systems", Oct. 1, 2004, (895 pages).
(Continued)

*Primary Examiner* — Peter Cheng
(74) *Attorney, Agent, or Firm* — Harrington & Smith

(57) ABSTRACT

There are provided measures for load balancing in relay-enhanced access networks with a relay device and multiple access devices, said measures exemplarily including the setting of multiple links between a backbone device of a backbone network and said multiple access devices, and a management of resource allocation of said multiple links between said backbone device and said multiple access devices in accordance with resource information of said multiple access devices indicating resource availability and resource assignment of said multiple access devices for establishing multiple connections between said backbone device and said relay device via said multiple access devices.

15 Claims, 10 Drawing Sheets

(51) Int. Cl.
*H04L 12/729* (2013.01)
*H04L 12/721* (2013.01)
*H04L 12/803* (2013.01)
*H04B 7/26* (2006.01)
*H04W 16/26* (2009.01)
*H04W 48/16* (2009.01)
*H04W 72/02* (2009.01)
*H04W 76/02* (2009.01)
*H04W 84/04* (2009.01)
*H04W 88/04* (2009.01)
*H04W 92/04* (2009.01)

(52) U.S. Cl.
CPC .............. *H04B 7/2606* (2013.01); *H04W 16/26* (2013.01); *H04W 48/16* (2013.01); *H04W 72/02* (2013.01); *H04W 76/02* (2013.01); *H04W 84/047* (2013.01); *H04W 88/04* (2013.01); *H04W 92/045* (2013.01)
USPC ........................................................ 370/235

(56) References Cited

U.S. PATENT DOCUMENTS

2008/0232296 A1   9/2008  Shin et al. ...................... 370/315
2010/0091669 A1*  4/2010  Liu et al. ........................ 370/252

OTHER PUBLICATIONS

R1-082397, 3GPP TSG RAN WG1 Meeting #54, Warsaw, Poland, Jun. 30-Jul. 4, 2008, Panasonic, "Discussion on the Various Types of Relays, 12 Study Item on LTE-Advanced", 6 pgs.

\* cited by examiner

LOAD BALANCING IN RELAY-ENHANCED ACCESS NETWORKS

FIELD OF THE INVENTION

The present invention generally relates to load balancing in relay-enhanced access networks. Specifically, the present invention relates to load balancing in relay-enhanced access networks comprising a relay device and multiple access devices.

BACKGROUND OF THE INVENTION

In the development of radio communication systems, such as mobile communication systems (like for example GSM (Global System for Mobile Communication), GPRS (General Packet Radio Service), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed in research and development as well as in standardization. Accordingly, such improved radio access networks are sometimes denoted as evolved radio access networks (like for example the Evolved Universal Terrestrial Radio Access Network (E-UTRAN)) or as being part of a long-term evolution (LTE). Although such denominations primarily stem from 3GPP (Third Generation Partnership Project) terminology, the usage thereof hereinafter is not intended to limit the respective description to 3GPP technology, but is rather intended to generally refer to any kind of radio access evolution irrespective of the specific underlying system architecture. Another example for an applicable broadband access system may for example be IEEE 802.16 also known as WiMAX (Worldwide Interoperability for Microwave Access).

In the following, for the sake of intelligibility, LTE (Long-Term Evolution according to 3GPP terminology) is taken as a non-limiting example for a broadband radio access network being applicable in the context of the present invention and its embodiments. However, it is to be noted that any kind of radio access network may likewise be applicable, as long as it exhibits comparable features and characteristics as described hereinafter.

In the development of cellular systems in general, and access networks in particular, relaying has been proposed as one concept. In relaying, a user equipment or terminal (UE) is not directly connected with an access node such as a radio base station (e.g. denoted as eNodeB or eNB) of a radio access network (RAN), but via a relay node (RN). FIG. 1 shows a schematic diagram of a typical deployment scenario of a relay-enhanced access network with radio-relayed extensions.

Relaying by way of relay stations (RSs) or relay nodes (RNs) have been proposed for the purposes of extending the coverage of cellular systems, providing a high-bit-rate coverage in high shadowing environments, reducing average radio-transmission power at the user equipment so as to prolong battery lifetime, enhancing cell capacity and effective throughput, e.g. increasing cell-edge capacity and balancing cell load, and enhancing overall performance and deployment cost of radio access networks.

A requirement for the deployment of relay-based extensions (for example in LTE-Advanced) is backward compatibility with current access networks (in case of LTE, for example with LTE-Release 8). This is especially important from the UE side, as it will allow users to benefit from relaying with Release 8 terminals. That is, LTE-Release 8 terminals and LTE-Advanced terminals should work equally well in LTE-Release 8 and LTE-Advanced networks. At the network side, software and even hardware updates between standard releases may be possible, but preferably they should be as small as possible. Hence, from the UE side, the serving network node should function in exactly the same way as a Release 8 access node (i.e. an eNB).

When reference is made to relaying, especially in the context of relay-enhanced access networks such as LTE, the normal assumption is that the relay nodes are controlled, either completely or partially, by access nodes such as eNBs (also known as "mother eNBs"). When a relay node is powered on, it is required that an eNB has to be selected as a mother eNB before the relay node can become fully operational. This is because it is not yet connected to the core network side, and relaying a UE connection is feasible only through the mother eNB.

FIG. 2 shows a schematic diagram of an architecture of a relay-enhanced access network with a radio-relayed extension.

According to FIG. 2, it may be assumed that the radio access network RAN comprises one or more cells, each of which is served by one eNB as an access node or radio base station. The relay node RN is connected to its mother eNB through the SX interface (i.e. the relay link), and the eNBs are connected to the backbone/core network via the S1 interface, respectively. For load sharing/balancing and handover purposes, the eNBs communicate with each other through the X2 interface. Note that the association between the mother eNB and the RN can either be static or dynamic, i.e. The mother eNB role can be assigned to another eNB while the RN is active. As representative examples for backbone/core nodes of the backbone/core network, there are exemplarily depicted two MME/EPC (MME: mobility management entity, EPC: evolved packet core) gateways. Any eNB is connected with one MME/EPC gateway.

The architecture shown in FIG. 2 is a solution for enabling relaying in a LTE environment. However, in this architecture, there exist problems regarding system performance due to potential capacity bottlenecks.

The fact that there is a one-to-one correspondence between a relay node RN and an access node eNB (i.e. though an eNB can be connected to multiple RNs, a RN is connected only to one eNB), might limit the system performance because the end-to-end performance of relayed UEs will be constrained by the capacity available on the backbone link between the mother eNB and the core network (i.e. the link that is accessible through the S1 interface). For example, even if there are sufficient radio resources for the relay link, the performance of relayed UEs can degrade, if there is congestion in the backbone. In practice, S1 links are expensive, and there is usually not enough capacity on S1 links to support the maximum cell capacity offered by the air interface provided by an access node eNB.

Apart from the backbone that can turn out to be a capacity bottleneck, there may be insufficient resources on the relay link between the relay node RN and the mother eNB. In such a case, load sharing/balancing with a lightly loaded neighboring eNB (i.e. cell) could be conceivable. Such a scenario is illustrated in FIG. 3.

FIG. 3 shows a schematic diagram illustrating the variability of load distribution between two neighboring cells of a relay-enhanced access network.

As can be gathered from FIG. 3, there are not enough resources in the cell of the mother eNB (on the right hand side of FIG. 3) for the relay link, while the neighboring eNB (on the left hand side of FIG. 3) is very lightly loaded. Though handover to the lightly loaded cell may be an option for dealing with this load situation, a handover is not a totally flexible solution as back and forth handover of the relay and all its relayed UEs between eNBs can be an expensive procedure (e.g. in terms of capacity, overload, etc.). Moreover, with a handover, there may only be used the capacity of just one neighboring cell, instead of the sum of the available capacity in all the neighboring cells, which would be preferable. Relay nodes may also be multi-mode relay nodes, i.e. supporting multiple air interfaces. The use of multi-mode relay nodes may open the possibility of varying a load distribution between neighboring cells, where the relay node is connected at the same time to several eNBs via different interfaces, which can belong to different network technologies.

In this regard, it has been proposed that neighboring cells can communicate their load information via the X2 interface, which may then lead to a handover of some of the users to the neighboring cell, i.e. the load sharing is performed by handing over some of the users to the slightly loaded cell. However, after handover again, the same capacity bottlenecks as in the old cell (i.e. on the S1 interface and on the relay link) may prevail. Thus, performing a handover for load sharing may generally not improve the overall system performance in relay-enhanced access networks.

Accordingly, there does not exist any feasible solution for facilitating efficient load balancing in relay-enhanced access networks.

SUMMARY OF EMBODIMENTS OF THE INVENTION

The present invention and its embodiments are made to provide for a feasible solution for facilitating efficient load balancing in relay-enhanced access networks.

According to an exemplary first aspect of the present invention, there is provided a method being operable at a backbone device of a backbone network, comprising acquiring resource information of multiple access devices of an access network, said resource information indicating resource availability and resource assignment of said multiple access devices for establishing multiple connections between said backbone device and a relay device of said access network via said multiple access devices, setting multiple links between said backbone device and said multiple access devices, and managing resource allocation of said multiple links between said backbone device and said multiple access devices in accordance with said resource information.

According to further developments or modifications thereof, one or more of the following applies:
said resource information is configured to indicate resource availability and resource assignment for one of connecting said backbone device with any one of said multiple access devices and any one of said multiple access devices with said relay device, and connecting said backbone device with any one of said multiple access devices and any one of said multiple access devices other than a dominant access device controlling said relay device with said dominant access device and said dominant access device with said relay device,
said multiple links are shared for load balancing between said backbone device and said relay device via said multiple access devices, and/or
the further comprises data processing comprising at least one of receiving data from said multiple access devices via said multiple links, coordinating the received data, re-sequencing the received data into a proper data sequence, and scheduling and distributing data towards said relay device to said multiple access devices via said multiple links.

According to an exemplary second aspect of the present invention, there is provided an apparatus comprising an acquiring unit configured to acquire resource information of multiple access devices of an access network, said resource information indicating resource availability and resource assignment of said multiple access devices for establishing multiple connections between said apparatus and a relay device of said access network via said multiple access devices, a setting unit configured to set multiple links between said apparatus and said multiple access devices, and a resource managing unit configured to manage resource allocation of said multiple links between said apparatus and said multiple access devices in accordance with said resource information.

According to further developments or modifications thereof, one or more of the following applies:
said resource information is configured to indicate resource availability and resource assignment for one of connecting said apparatus with any one of said multiple access devices and any one of said multiple access devices with said relay device, and connecting said apparatus with any one of said multiple access devices and any one of said multiple access devices other than a dominant access device controlling said relay device with said dominant access device and said dominant access device with said relay device,
said setting unit is further configured to set said multiple links being shared for load balancing between said apparatus and said relay device via said multiple access devices, and/or
the apparatus further comprises a data processing unit being configured to at least one of receiving data from said multiple access devices via said multiple links, coordinating the received data, re-sequencing the received data into a proper data sequence, and scheduling and distributing data towards said relay device to said multiple access devices via said multiple links.

According to an exemplary third aspect of the present invention, there is provided a computer program product comprising program code means being arranged, when run on a processor of an apparatus, to perform the method according to the first aspect and/or any development or modification thereof.

According to an exemplary fourth aspect of the present invention, there is provided a method being operable at an access device of an access network, comprising obtaining resource information of multiple access devices of said access network, said resource information indicating resource availability and resource assignment of said access device and at least one further access device of said access network for establishing multiple connections between a relay device of said access network and a backbone device of a backbone network via said multiple access devices, controlling said multiple connections between said relay device and said backbone device via said multiple access devices, said multiple connections including multiple links between said backbone device and said multiple access devices, and processing data between said relay device and said backbone device via said multiple connections in accordance with said resource information.

According to further developments or modifications thereof, one or more of the following applies:

said multiple connection controlling comprises requesting setting of multiple links between said relay device and said multiple access devices, and connecting said relay device with any one of said multiple access devices via said multiple links and any one of said multiple access devices with said backbone device, the method further comprises notifying said relay device of said resource information, said multiple connection controlling comprises connecting said relay device and said access device via a single link and said access device with said backbone device directly as well as indirectly via any one of the at least one further access device, the method further comprises managing resource allocation of said multiple links between said backbone device and said multiple access devices in accordance with said resource information, said data processing comprises at least one of receiving data from said backbone device via said multiple links, coordinating the received data, re-sequencing the received data into a proper data sequence, and forwarding the re-sequenced data on said single link to said relay device, and scheduling and distributing data towards said backbone device to said multiple links between said backbone device and said multiple access devices, said resource information obtaining comprises querying said multiple access devices for available resources, assigning available resources for said multiple connections, generating said resource information on the basis of the resource availability and the resource assignment, and sending said resource information to said backbone device, and/or said multiple links are shared for load balancing between said backbone device and said relay device via said multiple access devices.

According to an exemplary fifth aspect of the present invention, there is provided an apparatus comprising an obtaining unit configured to obtain resource information of multiple access devices of said access network, said resource information indicating resource availability and resource assignment of said apparatus acting as an access device and at least one further access device of said access network for establishing multiple connections between a relay device of said access network and a backbone device of a backbone network via said multiple access devices, a controlling unit configured to control said multiple connections between said relay device and said backbone device via said multiple access devices, said multiple connections including multiple links between said backbone device and said multiple access devices, and a data processing unit configured to process data between said relay device and said backbone device via said multiple connections in accordance with said resource information.

According to further developments or modifications thereof, one or more of the following applies:

said controlling unit comprises a setting requesting unit configured to request setting of multiple links between said relay device and said multiple access devices, and a connecting unit configured to connect said relay device with any one of said multiple access devices via said multiple links and any one of said multiple access devices with said backbone device, the apparatus further comprises a notifying unit configured to notify said relay device of said resource information, said controlling unit is further configured to connect said relay device and said apparatus via a single link and said apparatus with said backbone device directly as well as indirectly via any one of the at least one further access device, the apparatus further comprises a resource managing unit configured to manage resource allocation of said multiple links between said backbone device and said multiple access devices in accordance with said resource information, said data processing unit is further configured to at least one of receiving data from said backbone device via said multiple links, coordinating the received data, re-sequencing the received data into a proper data sequence, and forwarding the re-sequenced data on said single link to said relay device, and scheduling and distributing data towards said backbone device to said multiple links between said backbone device and said multiple access devices, said obtaining unit further comprises a querying unit configured to query said multiple access devices for available resources, an assigning unit configured to assign available resources for said multiple connections, a generating unit configured to generate said resource information on the basis of the resource availability and the resource assignment, and a sending unit configured to send said resource information to said backbone device, said multiple links are shared for load balancing between said backbone device and said relay device via said multiple access devices, and/or said apparatus is operable as an access device of an access network.

According to an exemplary sixth aspect of the present invention, there is provided a computer program product comprising program code means being arranged, when run on a processor of an apparatus, to perform the method according to the fourth aspect and/or any development or modification thereof.

According to an exemplary seventh aspect of the present invention, there is provided a method being operable at a relay device of an access network, comprising establishing multiple connections between said relay device and a backbone device of a backbone network via multiple access devices of said access network, said multiple connections including multiple links between said backbone device and said multiple access devices, acquiring resource information of said multiple access devices, said resource information indicating resource availability and resource assignment of said multiple access devices for said multiple connections, and processing data to and/or from said backbone device via said multiple connections in accordance with said resource information.

According to further developments or modifications thereof, one or more of the following applies:

the method further comprises setting multiple links between said relay device and said multiple access devices in accordance with said resource information, wherein said multiple connection establishing comprising connecting said relay device with any one of said multiple access devices via said multiple links and any one of said multiple access devices with said backbone device, the method further comprises managing resource allocation of said multiple links between said relay device and said multiple access devices in accordance with said resource information, said data processing comprises at least one of receiving data from said multiple access devices via said multiple links, coordinating the received data, re-sequencing the received data into a proper data sequence, and scheduling and distributing data towards said backbone device to said multiple access devices via said multiple links, said setting comprises any one of establishing, reconfiguring and releasing said multiple links, said multiple links are shared for load balancing between said relay device and said backbone device via said multiple access devices, and/or said multiple connection establishing comprises connecting said relay device and said dominant access device via a single link and said dominant access device with said backbone device directly as well as indirectly via any one of the multiple access devices other than said dominant access device.

According to an exemplary eighth aspect of the present invention, there is provided an apparatus comprising an establishing unit configured to establish multiple connections between said apparatus and a backbone device of a backbone network via multiple access devices of said access network, said multiple connections including multiple links between said backbone device and said multiple access devices, an acquiring unit configured to acquire resource information of said multiple access devices, said resource information indicating resource availability and resource assignment of said multiple access devices for said multiple connections, and a data processing unit configured to process data to and/or from said backbone device via said multiple connections in accordance with said resource information.

According to further developments or modifications thereof, one or more of the following applies:

the apparatus further comprises a setting unit configured to set multiple links between said apparatus and said multiple access devices in accordance with said resource information, wherein said establishing unit is further configured to connect said apparatus with any one of said multiple access devices via said multiple links and any one of said multiple access devices with said backbone device, the apparatus further comprises a resource managing unit configured to manage resource allocation of said multiple links between said apparatus and said multiple access devices in accordance with said resource information, said data processing unit is further configured to at least one of receiving data from said multiple access devices via said multiple links, coordinating the received data, re-sequencing the received data into a proper data sequence, and scheduling and distributing data towards said backbone device to said multiple access devices via said multiple links, said multiple links are shared for load balancing between said relay device and said backbone device via said multiple access devices, said establishing unit is further configured to connect said apparatus and said dominant access device via a single link and said dominant access device with said backbone device directly as well as indirectly via any one of the multiple access devices other than said dominant access device, and/or said apparatus is operable as relay device of an access network.

According to an exemplary ninth aspect of the present invention, there is provided a computer program product comprising program code means being arranged, when run on a processor of an apparatus, to perform the method according to the seventh aspect and/or any development or modification thereof.

By way of exemplary embodiments of the present invention, there is provided a more flexible and robust architecture as well as mechanisms to solve capacity bottleneck problems, i.e. to facilitate efficient load sharing, in relay-enhanced access networks.

By way of exemplary embodiments of the present invention, there is provided a more flexible and robust architecture as well as mechanisms to resolve capacity bottlenecks due to the above-outlined one-to-one correspondence between a relay node and an access node. Accordingly, it is proposed that multiple connections between relay node and core network are established, so that data of relayed user equipments may be transported to and from the core network via multiple connections (i.e. multiple eNBs) instead of just one connection via the mother eNB. Stated in other words, it is proposed that links between access network and backbone network (i.e. S1 links in case of LTE) of more than one access node (i.e. eNB in case of LTE) are shared.

By way of exemplary embodiments of the present invention, there is provided a more flexible and robust architecture as well as mechanisms to dynamically decide the route of data on the basis of current load conditions in an access network, thus obviating any predetermined dedicated path between end nodes.

By way of exemplary embodiments of the present invention, the following effects may be achieved. Distributed S1 relaying may be supported for example in a relay-enhanced (LTE) access network. Such a distributed S1 relaying may be transparent to the user equipments in the system, and as such e.g. Release 8 UEs will benefit from it. To this end, there is provided a decision mechanism at an access device (i.e. eNB), a relay device (i.e. RN) and a backbone device (i.e. gateway or central network controller) as to where to route the data (i.e. on which path of S1/SX or S1/X2/SX links), and mechanisms for the re-sequencing of data arriving via several S1 interfaces at the backbone device and, in one approach, data coming via several SX interfaces at the relay device. The support of a distributed/shared S1 interface may not only make the system more robust to problems related to transport network under-dimensioning, but it may also make the system more flexible by creating alternatives for load sharing and load switching.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

Figure 1:
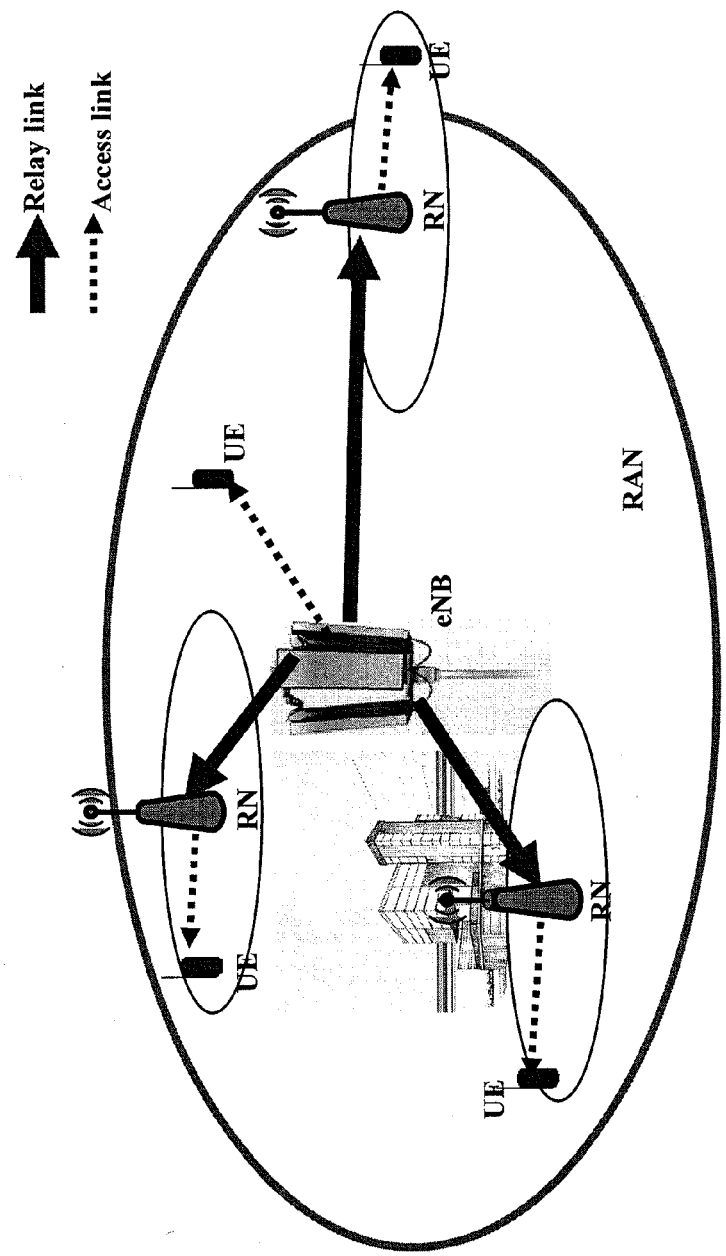
FIG. 1 shows a schematic diagram of a typical deployment scenario of a relay-enhanced access network with radio-relayed extensions.
Figure 2:
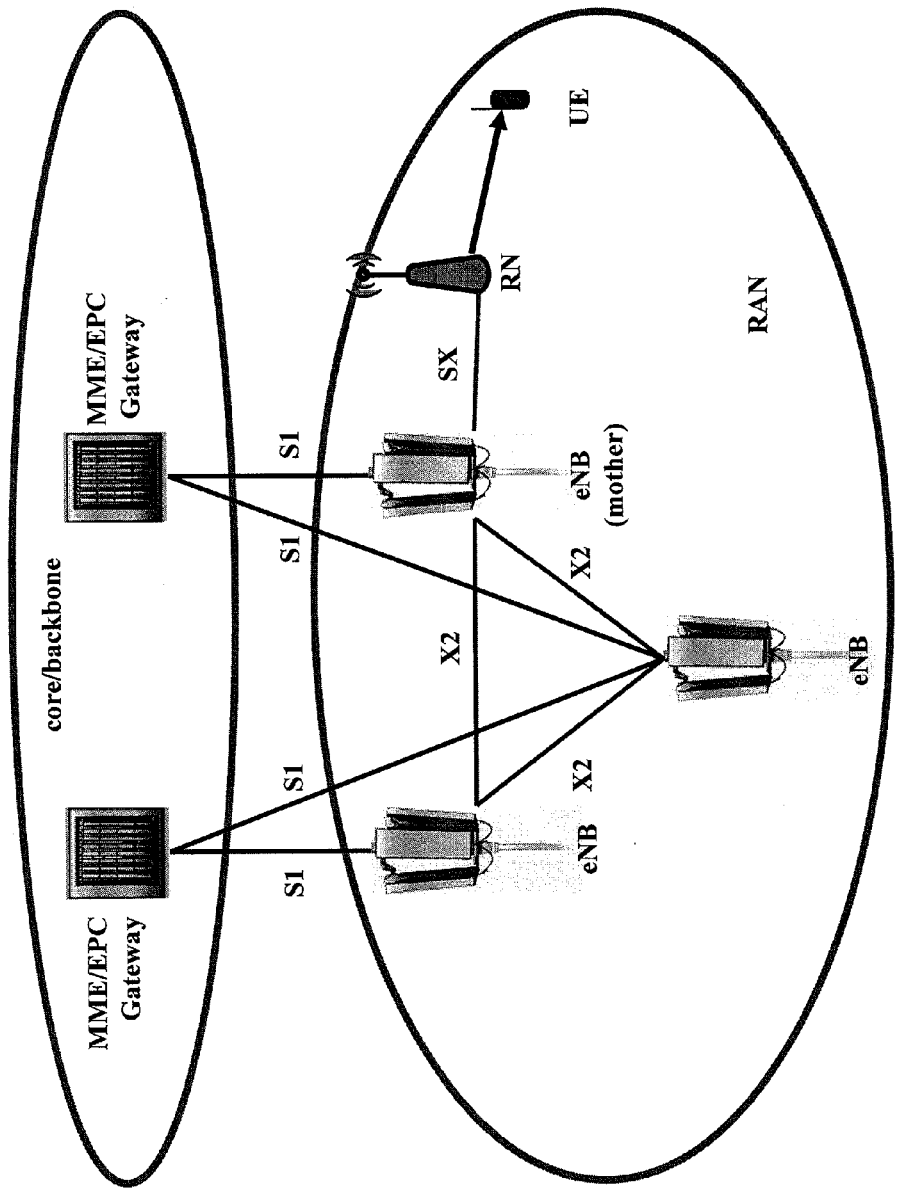
FIG. 2 shows a schematic diagram of an architecture of a relay-enhanced access network with a radio-relayed extension.
Figure 3:
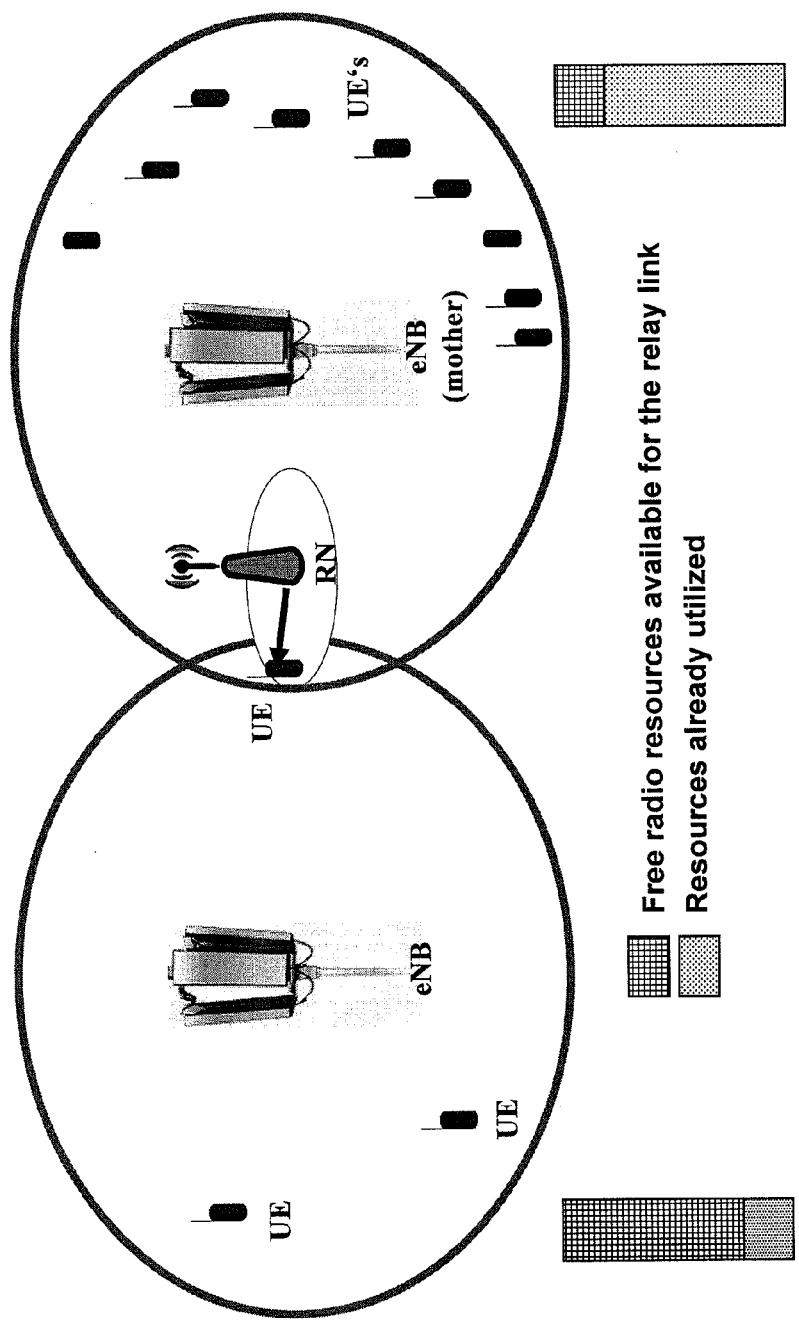
FIG. 3 shows a schematic diagram illustrating the variability of load distribution between two neighboring cells of a relay-enhanced access network.

The present invention is described herein with reference to particular non-limiting examples. A person skilled in the art will appreciate that the invention is not limited to these examples, and may be more broadly applied.

In particular, the present invention and its embodiments are mainly described in relation to 3GPP specifications being used as non-limiting examples for certain exemplary network configurations. In particular, an LTE (E-UTRAN) radio access network and corresponding standards (Release-8, Release-9, and LTE-Advanced) are used as a non-limiting example in this regard. As such, the description of the embodiments given herein specifically refers to terminology which is directly related thereto. Such terminology is only used in the context of the presented non-limiting examples, and does naturally not limit the invention in any way. Rather, any other network configuration or implementation may also be utilized as long as compliant with the features described herein.

In the following, various embodiments and implementations of the present invention and its aspects or embodiments are described using several alternatives. It is generally to be noted that, according to certain needs and constraints, all of the described alternatives may be provided alone or in any conceivable combination (also including combinations of individual features of the various alternatives).

Generally, the following remarks regarding relaying are to be noted.

There are many kinds of relay systems starting from the simplest one, i.e. amplify/forward, and ending up at the most complex one, which utilizes a network coding to improve the overall performance. The most common relay type for cellular relaying is a detect/forward type of relay, where an input signal is detected and retransmitted using the same procedure as in the original transmission. While not being limited thereto, such an approach is exemplarily assumed in the following.

Relaying can be realized at different layers of a protocol stack. A simple amplify and forward relaying can be realized at the L1 of the protocol stack, where the relay is required to have only (some part of) the physical layer. L2 relay nodes, which include the protocol stack up to the MAC/RLC (MAC: medium access control, RLC: radio link control) layers, enable the possibility of doing decentralized radio resource management. L3 or higher layer relay nodes could almost be considered as wireless base stations and support all the protocol layers of normal base stations. While not being limited thereto, L3 or higher layer relaying (wherein the relay node's protocol stack includes relevant protocols up to the RRC layer (RRC: radio resource control protocol)) is assumed in the following.

Due to the above-mentioned requirement of backward compatibility, the reduction of eNB functionalities when defining a relay node will be difficult, and relay nodes need to support substantially all main eNB functions. Due to this fact, it may be assumed that relay nodes are capable of flexible resource sharing with the (mother) eNB that controls them. Moreover, it may be assumes that at maximum 2 hops are allowed in the system (i.e. eNB-UE or eNB-RN-UE), and that a tree topology is assumed (i.e. no connections between relays). Yet, the above assumptions are only used to simplify the description, but it is emphasized that the present invention and its embodiments may equally cover other network topologies.

According to a first approach of the present invention, embodiments thereof are based on the provision of multiple connections between backbone network and relay node by way of multiple (i.e. distributed or shared) links between backbone network and access nodes (i.e. S1 links) and multiple (i.e. distributed or shared) links between access nodes and the relay node (i.e. SX or relay links). Stated in other words, the relay node in question is connected to multiple eNBs through the SX interface, and each one of the multiple eNBs is connected to the backbone network through the S1 interface. Hence, the first approach may be denoted as multiple SX relaying.

Figure 4:
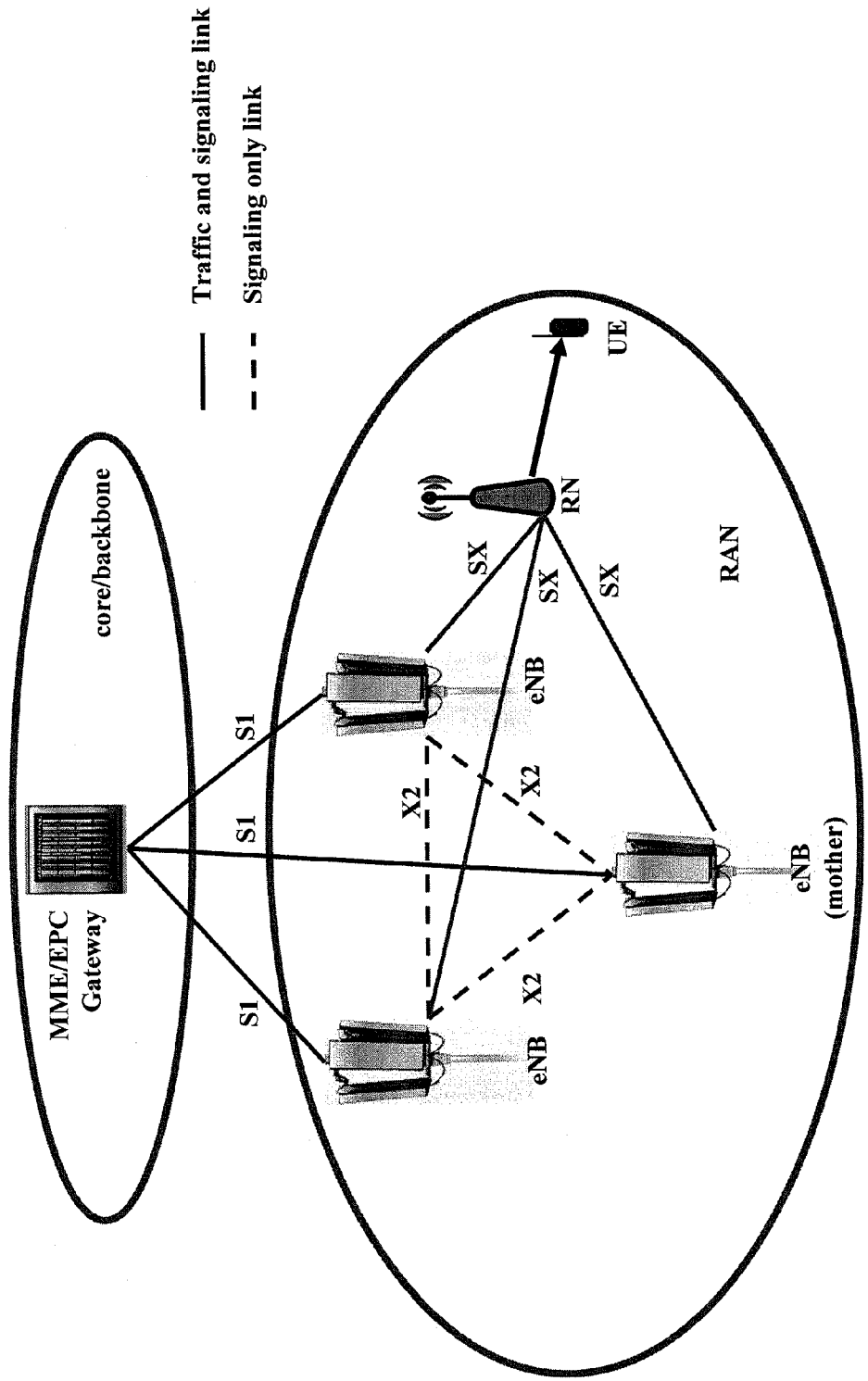
FIG. 4 shows a schematic diagram of an architecture of a relay-enhanced access network with a radio-relayed extension according to a first approach of the present invention.

FIG. 4 shows a schematic diagram of an architecture of a relay-enhanced access network with a radio-relayed extension according to the first approach of the present invention. While X2 links between eNBs are (mainly) used for signaling purposes, e.g. exchanging load conditions and resource information, data traffic from and to the relay node is passed over any conceivable combination of a S1 link and a SX link.

Figure 5:
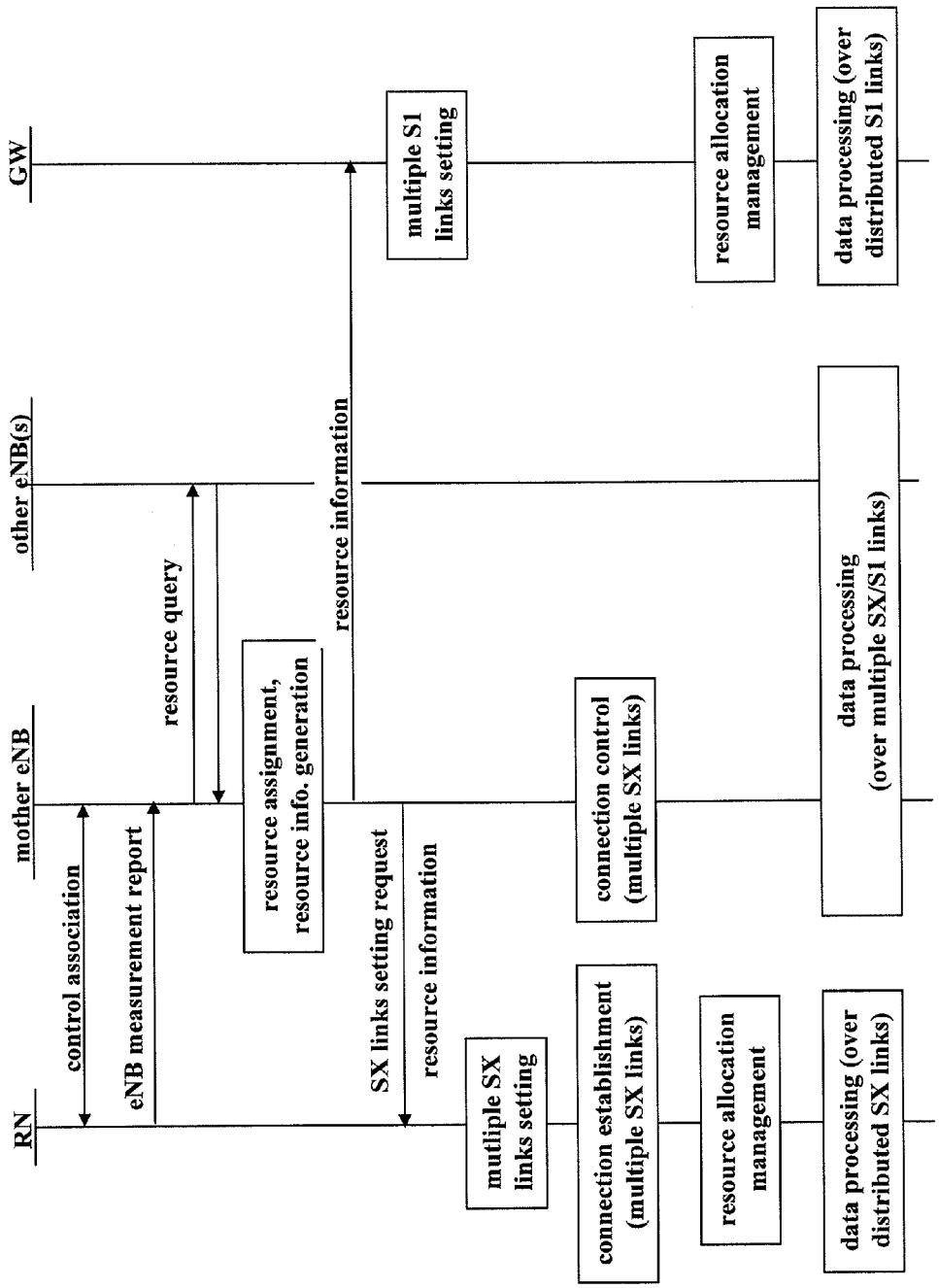
FIG. 5 shows a signaling diagram of a load sharing mechanism according to the first approach of the present invention.

FIG. 5 shows a signaling diagram of a load sharing mechanism according to the first approach of the present invention, which is based on the architecture of FIG. 4 (i.e. supporting multiple SX connections).

Initially, the relay node RN is associated only to the mother eNB, which may thus be regarded as a dominant access node controlling the relevant relay node RN. This does not change as long as a required quality of service (QoS) can be achieved for the relayed UEs, i.e. as long as the load is sufficiently low. Due to congestion on the S1 link and/or unfavorable conditions on the SX radio link, the overall system performance of the relayed UEs and the cell accommodating the relay node RN may start to degrade, thus requiring efficient load sharing/balancing for the relay-enhanced access network.

In such a case, which is assumed hereinafter, the mother eNB may start to obtain resource information, to control the establishment of connections between backbone network and relay node, and to process data accordingly. In detail, based on a latest neighboring eNB measurement report (concerning SX links) from the relay node RN, the mother eNB may contact suitable neighboring eNBs to find out how much and which resources they are willing to share in providing additional SX radio links for the relay node RN. To this end, as depicted in FIG. 4, the mother eNB may query the other suitable eNBs for available resources, may then assign available resources for certain connections, and may thus generate resource information indicating resource availability and resource assignment of multiple access nodes for establishing multiple connections between the backbone network (e.g. a MME/EPC gateway) and the relay node RN. The query and the thus resulting resource information may include all necessary radio network temporary identity (RNTI) and radio configuration information for the relay node RN in order to establish and communicate with and via the relevant neighboring eNB(s).

Once an agreement concerning resource availability and assignment is reached between the mother eNB and the neighboring eNB(s), the mother eNB may contact a central network controller (that is a new functionality introduced in and thus represented by e.g. the MME/EPC Gateway) to set corresponding coordinated S1 links with indicated neighboring eNBs for the relevant relay node RN, and request the relay node RN to establish additional SX radio links with the concerned eNBs according to the assigned configurations.

Regarding the backbone node, the central network controller, i.e. the gateway, thus sets multiple S1 links in accordance with the received (i.e. acquired) resource information.

Regarding the relay node, upon the request from the mother eNB, the relay node RN sets multiple SX links in accordance with the received (i.e. acquired) resource information. The setting of links may generally comprise establishing, reconfiguring and releasing of respective links. The RN will be notified either by the mother eNB (as depicted) or the new eNB(s) which resources it can use to communicate with the new eNB(s).

On the basis if the thus set multiple SX links and multiple S1 links, multiple connections between the relay node RN and the backbone network/node are controlled by the mother eNB and/or established by the relay node RN. Thereby, the multiple SX-multiple S1 links architecture according to FIG. 4 is finally set up.

For traffic transportation, i.e. data processing, the relay node RN, where multiple SX links congregate, executes resource allocation for the SX interface in accordance with the assignment of available resources of the mother eNB and the other eNB(s). Accordingly, data processing is executed in the basis of the thus resulting resource allocations. In the uplink direction, i.e. originating from the relay node RN, the relay node RN sends data to the new eNB(s), if the resources used are those assigned for communicating with that/those eNB/s. The data is delivered via multiple SX links. Accordingly, in the uplink direction, the relay node schedules and distributes the data to multiple eNBs, namely based on the indicated available resources of relevant eNBs e.g. by the mother eNB. In the downlink direction, i.e. terminating at the relay node RN, the relay node RN receives the data via multiple SX links from multiple eNBs, coordinates them, and re-sequences the data into a proper data sequence (i.e. enabling in-order delivery of distributed SX data).

At the other end, the backbone node, where multiple S1 links congregate, executes resource allocation for the S1 interface in accordance with the assignment of available resources of the mother eNB and the other eNB(s). Accordingly, data processing is executed in the basis of the thus resulting resource allocations. In the uplink direction, i.e. terminating at the gateway, the gateway receives the data via multiple S1 links from multiple eNBs, coordinates them, and re-sequences the data into a proper data sequence (i.e. enabling in-order delivery of distributed S1 data). In the downlink direction, i.e. originating from the gateway, the gateway sends data to the new eNB(s), if the resources used are those assigned for communicating with that/those eNB/s. The data is delivered via multiple S1 links. Accordingly, in the downlink direction, the gateway schedules and distributes the data to multiple eNBs, namely based on the indicated available resources of relevant eNBs e.g. by the mother eNB.

The routing path decision in the downlink operation at the gateway of the backbone network may be made in the following two ways.

As a first option, the gateway may be communicated as to which eNBs are supplying the relay node RN. Depending on the loading of the S1 links of the eNBs involved, the gateway may then route the data over the different S1 links. Data belonging to the same bearer may end up being routed via different S1 links. As such, there should be a mechanism at the relay node RN to re-sequence data flow. This option may be optimal from the point of view of S1 links usage. However, the loading of the relay link of the different eNBs may not be considered.

As a second option, the mother eNB, the new eNB(s) and the gateway may decide together which bearers should go to which eNB. Thus, the gateway may route the downlink data based on this agreement. This option does not require any re-sequencing of data belonging to the same bearer, which are coming from different eNBs. However, it may be less flexible than the first option, and might lead to sub-optimal decisions.

Data processing in the concerned eNBs is a mere forwarding according to the relevant connection in accordance with the assigned and allocated resources.

It is to be noted that the sequence of operations, as depicted in FIG. 5, is intended to be exemplarily, and may be different. Further, not all of the depicted operations have to be present (e.g. the sending of the eNB measurement report is not necessary when the mother eNB may get or already have corresponding knowledge from another source), and/or other operations have be additionally present.

In addition to what is depicted in the mechanism of FIG. 5, the following procedures may also be implemented therein.

For example, one of the connected (other) eNBs may be nominated as the mother eNB which preferably has a sufficiently reliable radio connection to the relay node RN for important network coordination and control purposes towards the relay node RN. It is noted that, when the relay node RN is connected to the first eNB (e.g. upon network connection), this eNB is automatically the mother eNB. Then, when the relay node RN is connected to additional eNB(s), the current mother eNB will typically still play the role of the mother eNB, at least until the connection(s) to the additional eNB(s) are up and running properly. Then, the role of the mother eNB may be switched among relevant eNBs, if beneficial or needed. Such a role switching procedure may be implemented by way of interoperation of the relevant eNBs on their X2 links, e.g. by making a decision on the basis of any relevant parameter such as e.g. link reliability, load, etc.

Generally, the mother eNB is overall responsible for communicating with the aforementioned central network controller, i.e. the backbone node, with the relevant eNBs via X2 links, and with the relay node RN for e.g. management of distributed multiple SX radio connections including the addition, reconfiguration or release of corresponding distributed S1 link and/or SX radio connections towards the relay node RN, also for resource allocation and radio transmissions. In this regard, for example, the relay node RN may monitor resource allocation from the mother eNB for transmissions also to/from the other eNBs, in addition to the monitoring of allocation from all the relevant eNBs separately for transmissions.

It is to be noted that the multiple SX interfaces (i.e. links) may belong to the same network or different networks. In the case of a single-mode relay node, the SX links are of the same network (i.e. RAN). In case of a multi-mode relay node, then the SX links may be realized via different networks (i.e. RANs). For details in terms of multi-mode relay nodes, reference is made to below explanations.

According to a second approach of the present invention, embodiments thereof are based on the provision of multiple connections between backbone network and relay node by way of multiple (i.e. distributed or shared) links between backbone network and access nodes (i.e. S1 links) and a single link between an access node controlling the relay node (i.e. the mother eNB) and the relay node (i.e. a single SX or relay link). Stated in other words, only one connection is kept between the relay node in question and the mother eNB, and the mother eNB distributes the data to several eNBs via the X2 interface.

A working assumption for the second approach may be that radio resources on the relay link of the mother eNB are sufficient and the only problem to be dealt with is the congestion on the backbone link between the mother eNB and the backbone network. The relay node may thus be completely unaware of the distributed S1 relaying. In the uplink direction, the mother eNB may share the load via the X2 interface with the neighboring eNBs. Re-sequencing issues have to be dealt with in a similar way as in the first approach, possibly at a different place. The backbone device may route the downlink data in a similar fashion as detailed above. However, the eNBs (other than the mother eNB) may not have a direct communication with the relay node, and thus have to send the data to the mother eNB over respective X2 links.

The maximum backbone delay for control plane messages on the X2 interface is expected to be in the order of 20 ms. However, it is to be noted that this is not a strict upper bound in the sense that larger values may occur in rare scenarios. The typical average delay is expected to be in the region of 10 ms. Expecting not too much difference in terms of latency between control and user plane, the second approach might thus introduce some latency in user data transport.

Figure 6:
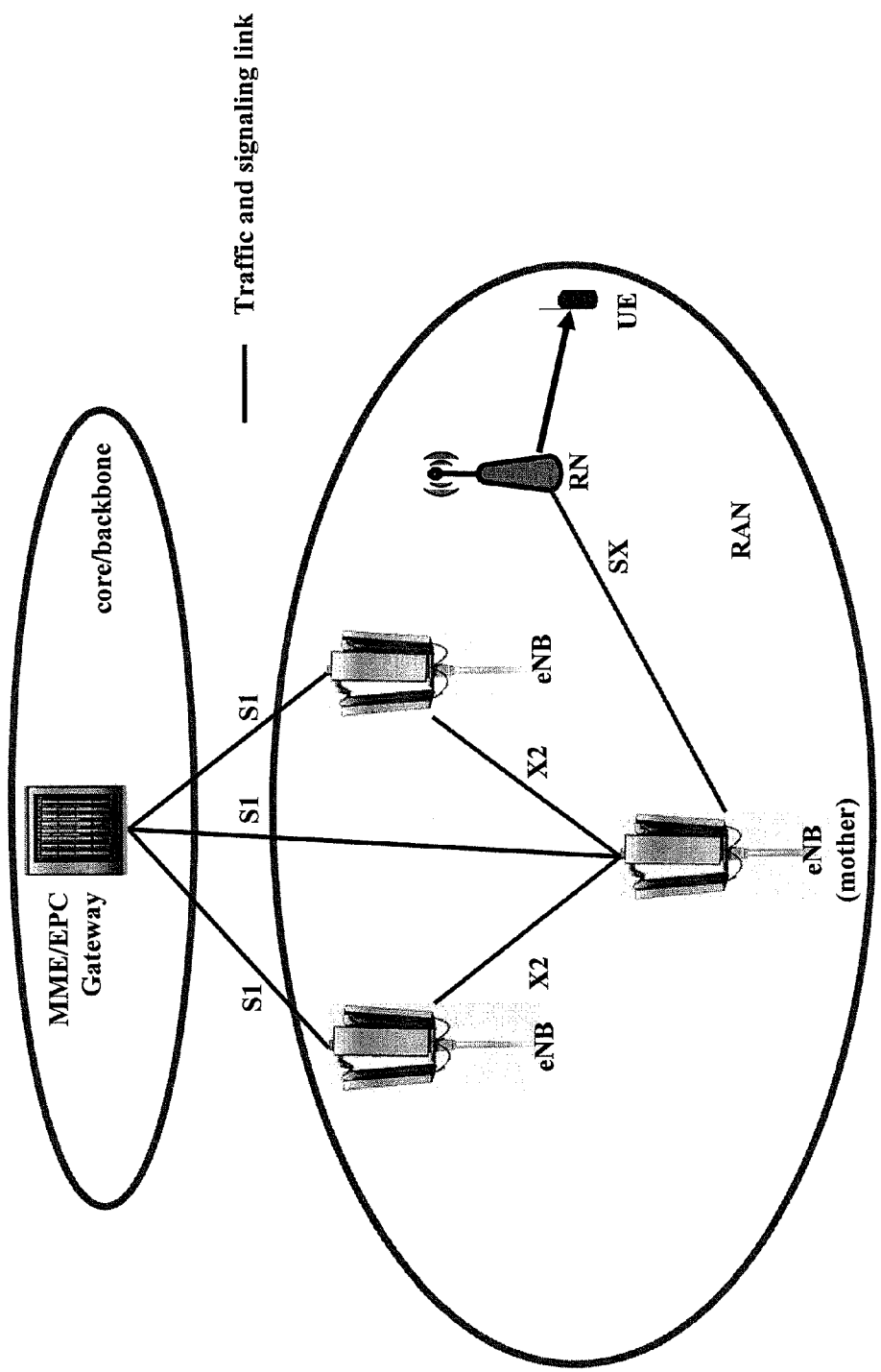
FIG. 6 shows a schematic diagram of an architecture of a relay-enhanced access network with a radio-relayed extension according to a second approach of the present invention.

FIG. 6 shows a schematic diagram of an architecture of a relay-enhanced access network with a radio-relayed extension according to the second approach of the present invention. According to this approach, X2 links between eNBs are, besides signaling purposes, e.g. exchanging load conditions and resource information, also used for data traffic from and to the relay node. Thus data traffic from and to the relay node may be passed over a combination of a S1 link (to the mother eNB) and a SX link (from the mother eNB to the relay node), or a combination of a S1 link (to a non-mother eNB), a X2 link (from the non-mother eNB to the mother eNB) and a SX link (from the mother eNB to the relay node).

Figure 7:
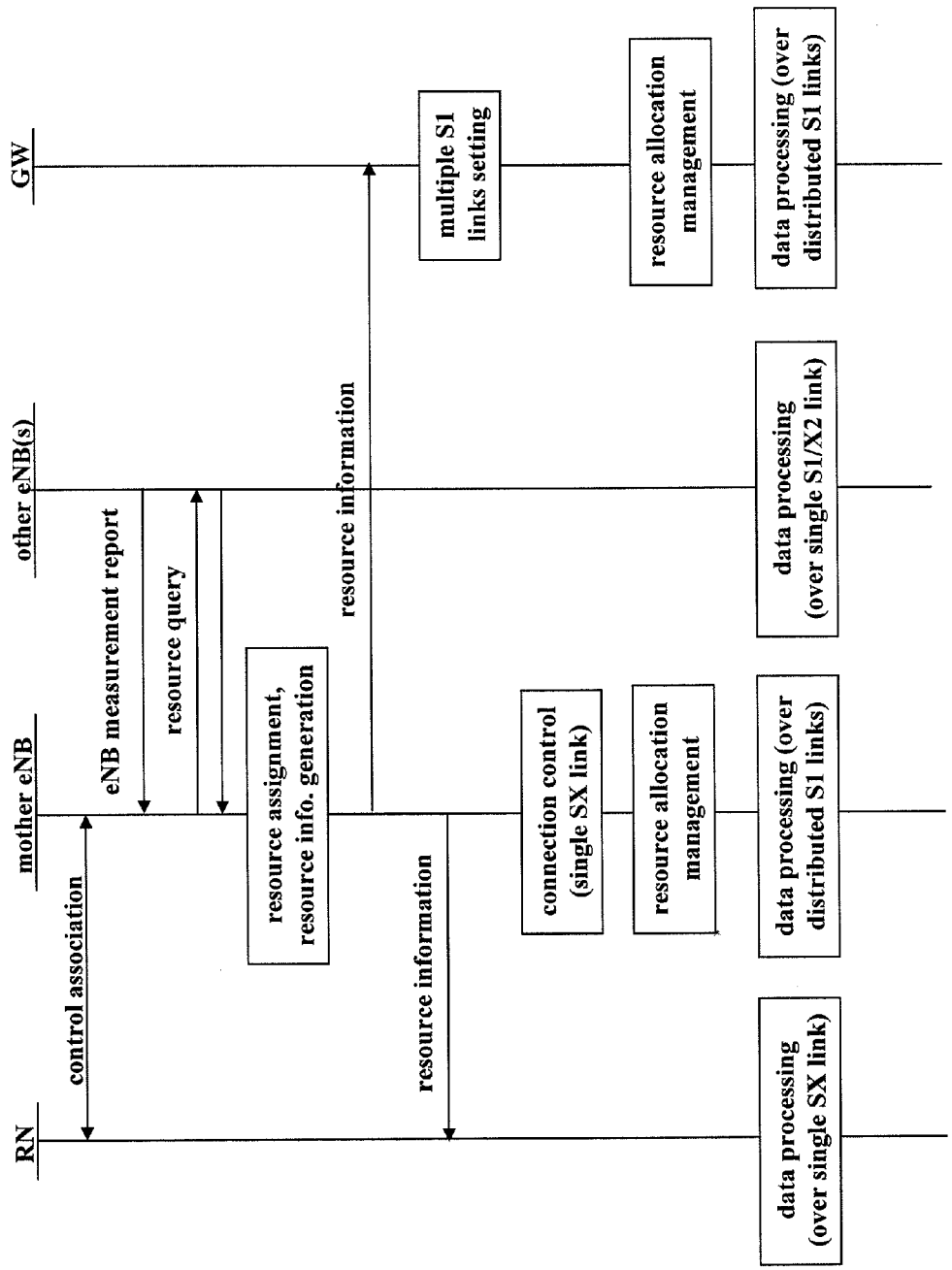
FIG. 7 shows a signaling diagram of a load sharing mechanism according to the second approach of the present invention.

FIG. 7 shows a signaling diagram of a load sharing mechanism according to the second approach of the present invention, which is based on the architecture of FIG. 6.

Since the load sharing mechanism according to the second approach, as depicted in FIG. 7, is mostly similar to the load sharing mechanism according to the first approach, as depicted in FIG. 5), reference is made to the description thereof. The following differences are to be noted yet.

According to the second approach, based on a latest neighboring eNB measurement report (concerning S1 links) from respective neighboring eNBs, the mother eNB may find out how much and which resources the respective neighboring eNBs are willing to share in providing additional links for the relay node RN. Instead of multiple SX links according to the first approach, there is only one SX link between the mother eNB and the relay node RN. This single SX link has already been established when the RN has connected to the mother eNB (i.e. prior to the procedure depicted in FIG. 7). Accordingly, both connection establishment/control and resource allocation for the relay node RN is based on the one SX link in combination with the multiple S1 links (and, as the case may be, X2 links). At the gateway side, the functions of resource allocation and data processing are equivalent to those according to the first approach, except that connections to the relay node may pass via a S1-X2-SX link combination and a S1-SX link combination. At the other side, the functions of resource allocation and data processing are also equivalent, with the same modification, but are arranged at the mother eNB since this is the point where the multiple S1 links congregate into a single SX link.

Data processing in the relay node and in the concerned eNBs is a mere forwarding according to the relevant connection in accordance with the assigned and allocated resources, without having any degrees of freedom regarding the routing path.

Accordingly, in the second approach, the relay node is not aware of this kind of distributed S1 relaying, as all of relevant procedures take place at the mother eNB and forwards (i.e. towards the core network).

It is to be noted that the sequence of operations, as depicted in FIG. 7, is intended to be exemplarily, and may be different. Further, not all of the depicted operations have to be present (e.g. the sending of the eNB measurement report is not necessary when the mother eNB may get or already have corresponding knowledge from another source), and/or other operations have be additionally present.

The following remarks are to be noted for both approaches discussed above.

The above approaches, by combining distributed and centralized coordination and control between eNBs and MME/EPC Gateway, are well aligned with the current architecture of E-UTRAN from the network deployment and RRM (radio resource management) perspectives. In these approaches, the mother eNB is responsible for coordinating with the relevant neighboring eNBs over the X2 interface, and for communicating with the central network controller functionality in the MME/EPC Gateway.

This means to have a distributed SX radio links setup and resource allocation and a centralized S1 links setup and resource allocation in the MME/EPC Gateway. Alternatively, there may also be implemented a centralized SX radio links setup and resource allocation and a centralized S1 links setup and resource allocation in the MME/EPC Gateway.

For also performing the connection control and resource allocation on SX radio links centrally in the MME/EPC Gateway, the neighboring eNB measurements from relay nodes RNs and the available resources on SX links from each relevant eNB need to be sent to the central network controller (i.e. the backbone node). These new measurement and reporting procedures of the eNBs and the RN towards MME/EPC Gateway may be performed when needed. In detail, referring to the mechanisms of FIGS. 5 and 7, the acquisition of resource information at the gateway is accomplished in that the gateway (instead of the mother eNB) receives an eNB measurement report from the relay node, queries the eNBs for their available resources, assigns the available resources for certain connections, and thus generates the resource information indicating resource availability and resource assignment of said eNBs for establishing multiple connections between the backbone device (i.e. gateway) and the relay device. Furthermore, the SX link or links setting request is sent from the gateway to the relay node RN. Optionally, the connection control for the SX link or links may also be relocated from the mother eNB to the gateway. Since load sharing usually works on a long-term basis with respect to packet scheduling, resource partitioning and so forth, the performance increase in terms of e.g. simplicity and reliability due to this centralized approach may compensate for the higher signaling effort.

In both approaches, while not being explicitly mentioned above, the relay nodes or relay devices being involved may equally be multi-mode relay nodes supporting multiple air interfaces, which may be connected at the same time to several access nodes, i.e. eNBs, via different interfaces which may belong to different network technologies.

In case multi-mode relay nodes are involved, distributed S1 relaying may, in particular, beneficially made use of when available resources in one network are not enough for a backbone link and at least some of the connections may have to be transferred to another network (i.e. the relay node will have active connections with several eNBs via different network interfaces). With the distributed S1 relaying, a relay node may connect to several eNBs at the same time. If it is a single-mode relay node, it will be using e.g. the LTE-Advanced interface for all the connection with the eNBs. If it is a multi-mode relay node, it may use different networks to connect with the different eNBs.

There may basically be two reasons for activating multiple interfaces. A first reason is that a new bearer is to be established by a relayed user equipment and there are not enough resources for the backbone link for this connection. In this case, the new bearer may be associated with the new interface and the rest of the bearers are not affected. A second reason is that a new bearer is to be established by a directly connected user equipment, but there are not enough radio resources, unless some resource being used for the backbone link are freed. In this case, the dominant access node (i.e. the mother eNB) has to select a relayed bearer or even bearers which have to be transferred to the new network, so that the new direct bearer can be admitted to the cell.

In case of multi-mode relay nodes being involved, not all networks may be available in all sites, and as such there may be a possibility to select an air interface not supported by the current mother eNB (for load balancing purpose) but by a neighboring eNB. In this case, a procedure between neighboring eNBs is needed, which may also involve the gateway, i.e. the backbone device.

During a connection to multiple eNBs, the resources that are going to be used for a certain RN-eNB link could either be orthogonal to the resources used in the other eNBs for their directly connected user equipment, or they could also be the same resources as those being used in the other eNBs, if spatial separation is utilized.

The mother eNB, i.e. the dominant access node, may communicate about the relay node to the suitable neighbors and get suitable parameters (e.g. a RNTI) to communicate over the air and S1 interfaces.

A working assumption for both approaches, which is taken as a basis for the exemplary illustrations of FIGS. 4 and 6, is that the neighboring eNBs are assumed to be connected to the same gateway of the backbone network. That is, the eNBs considered for sharing their S1 links are only those that are connected with the same gateway. However, even in the case of eNBs being connected to different gateways, both approaches are effective. In such a case, a network entity (interconnecting the different gateways) may be envisioned that may combine/re-sequence the packets arriving at the different gateways before they are forwarded to the destination. That is, the illustration of only one backbone device in FIGS. 4 and 6 is only exemplary so as to facilitate the description thereof.

While alternatives (e.g. approaches) and embodiments of the present invention have previously been described from an overall system's point of view, while specifically considering the interworking between individual entities, details about the individual methods and entities will be described herein below.

Figure 8:
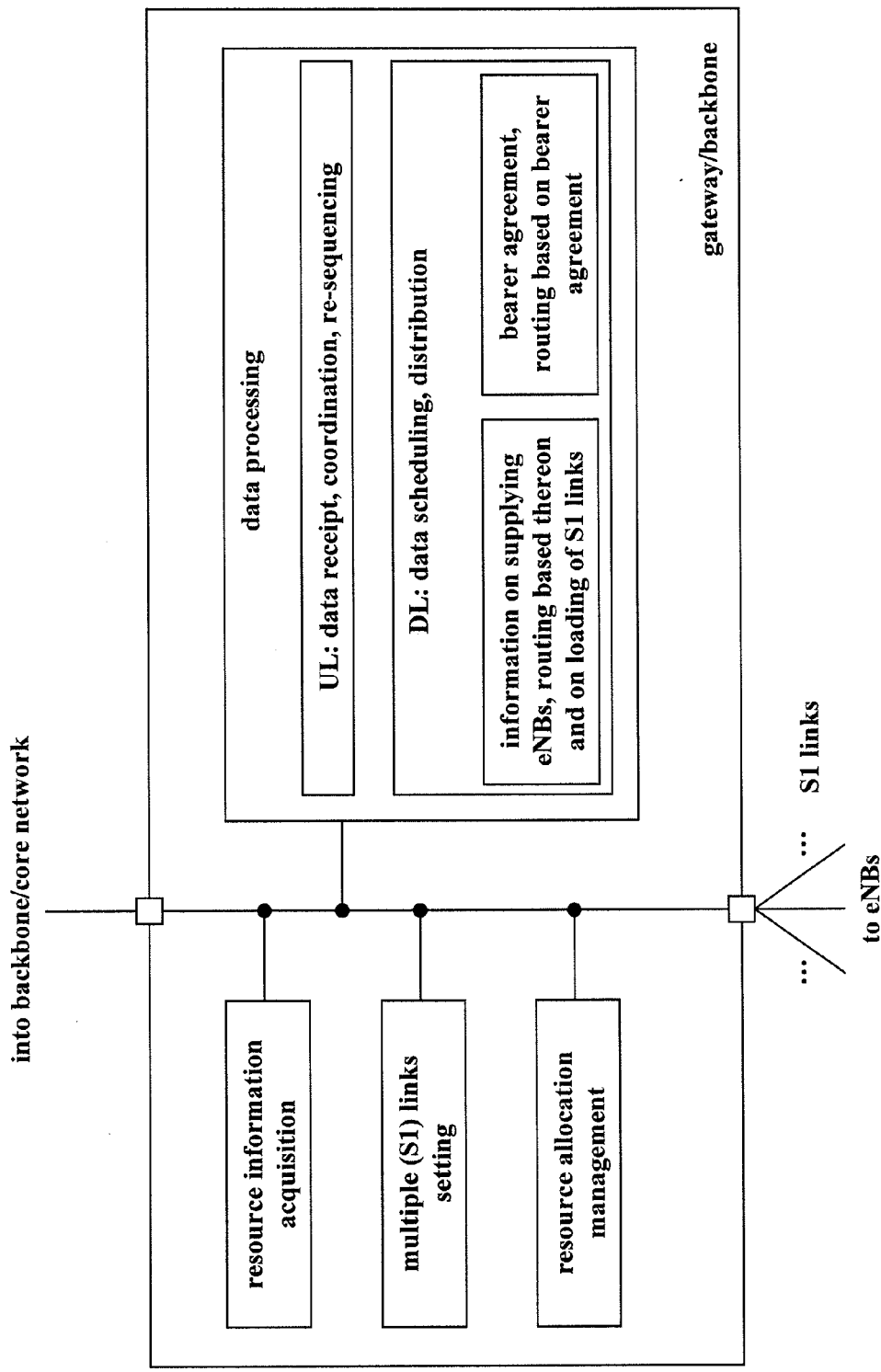
FIG. 8 shows a schematic diagram of functionality of a backbone device according to embodiments of the present invention.
Figure 9:
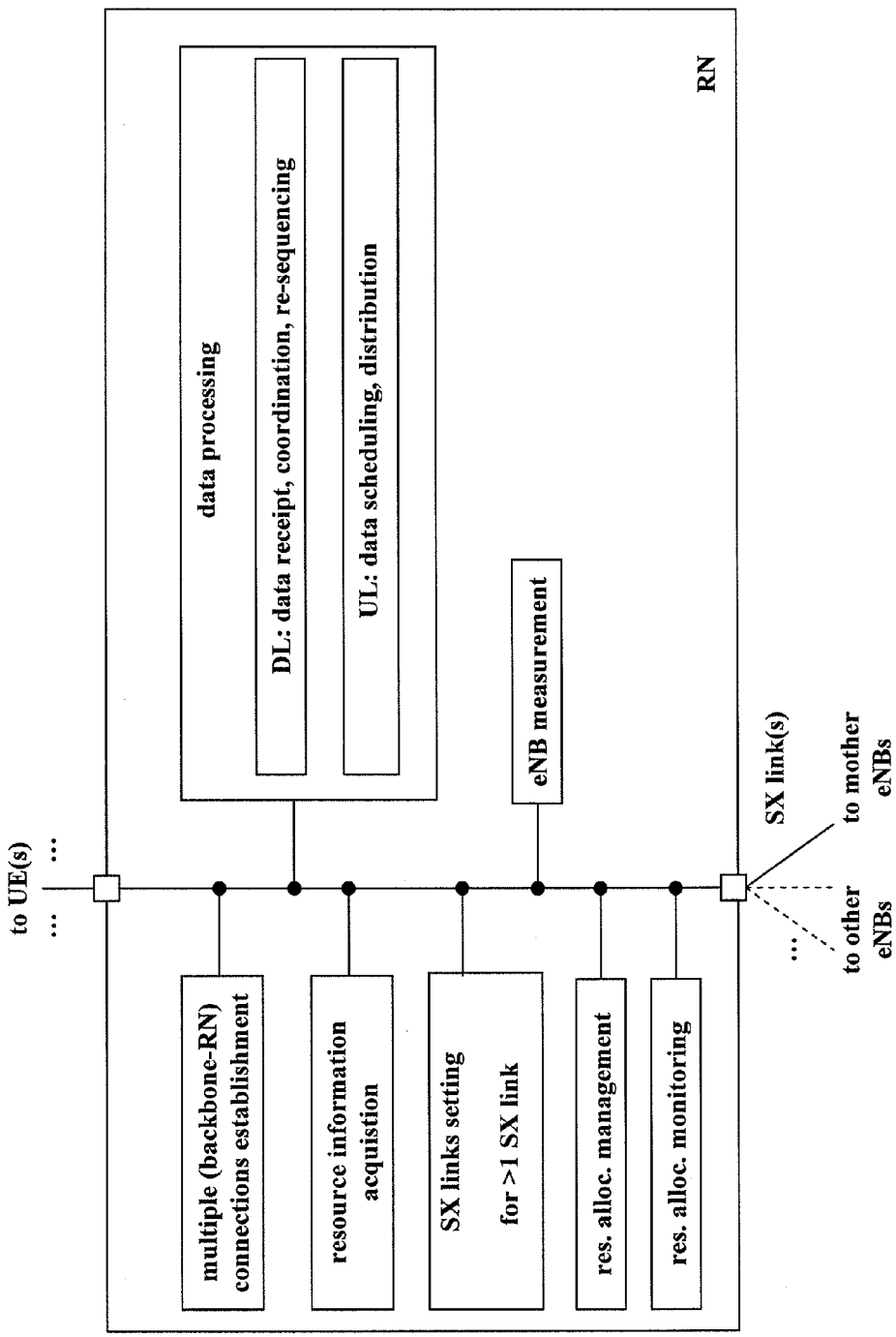
FIG. 9 shows a schematic diagram of functionality of a relay device according to embodiments of the present invention.
Figure 10:
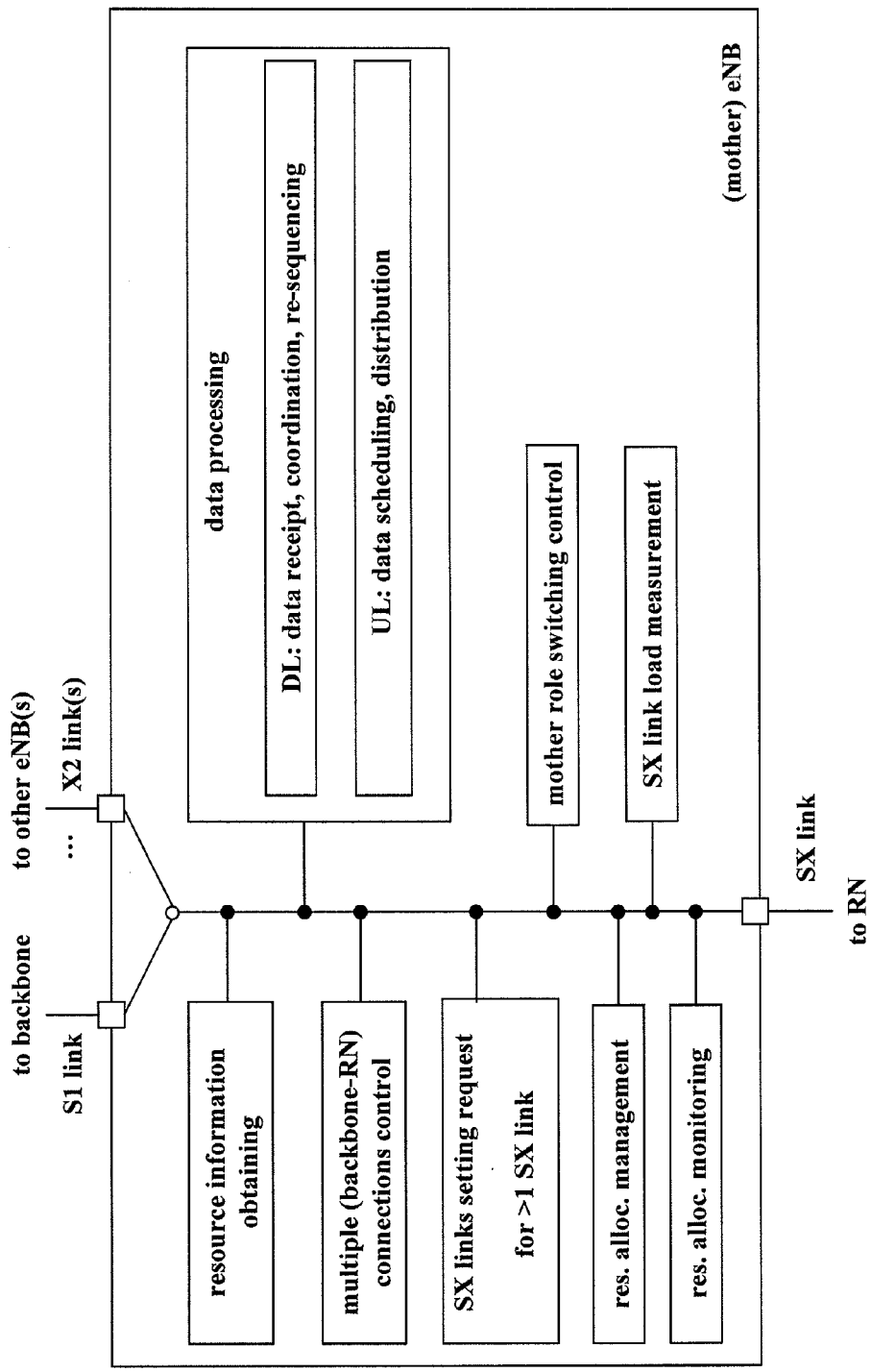
FIG. 10 shows a schematic diagram of functionality of an access device according to embodiments of the present invention.

For the sake of brevity, with reference to the following FIGS. 8 to 10, operations and procedures from a functional point of view are described in parallel with corresponding entities and functional units from a structural point of view, since these are basically in line with each other. That is, the following FIGS. 8 to 10 may be understood both as illustrations of methods as well as of corresponding entities, devices or software executing such methods.

In the following FIGS. 8 to 10, the solid and broken line blocks are basically configured to perform the basic operations. That is, the solid and broken line blocks are to be understood both as functions as well as structures. It is to be noted that the individual blocks are meant to illustrate respective functional blocks implementing a respective function, process or procedure, respectively. Such functional blocks are implementation-independent, i.e. may be implemented by means of any kind of hardware or software, respectively. The lines/arrows interconnecting individual blocks are meant to illustrate an operational coupling there-between, which on the one hand is implementation-independent (e.g. wired or wireless) and on the other hand may also comprise an arbitrary number of intermediary functional entities not shown. The sequence of the individual operations or functions is evident from the above description, e.g. in connection with FIGS. 5 and 7. Further, in FIGS. 8 to 10, only those functional blocks are illustrated, which relate to any one of the above-described methods, procedures and functions. A skilled person is deemed to acknowledge the presence of any other functions or functional blocks required for an operation of respective structural arrangements, such as e.g. a power supply, a central processing unit, respective memories or the like. Further, not all of the functional blocks being depicted in FIGS. 8 to 10 needs to be present, but at least some of them may also be omitted.

FIG. 8 shows a schematic diagram of functionality of a backbone device according to embodiments of the present invention. The thus depicted apparatus may for example be implemented as or in a backbone node, gateway or central network controller, as mentioned above.

According to the exemplary embodiment depicted in FIG. 8, the thus depicted backbone device comprises a resource information acquisition unit/function, a (multiple links) setting unit/function, a resource allocation unit/function, and optionally a data processing unit/function. Furthermore, the thus depicted backbone device comprises an interface or port for multiple S1 links towards access devices, i.e. eNBs, and an interface or port for a link toward the core/backbone network.

Stated in general terms, the resource information acquisition unit/function represents means for or an operation of acquiring resource information of multiple access devices eNB of an access network RAN, said resource information indicating resource availability and resource assignment of said multiple access devices for establishing multiple connections between said backbone device and a relay device RN of said access network via said multiple access devices. The (multiple links) setting unit/function represents means for or an operation of setting multiple links between said backbone device and said multiple access devices, and the resource allocation unit/function represents means for or an operation of managing resource allocation of said multiple links between said backbone device and said multiple access devices in accordance with said resource information. According to the above-outlined first approach, said resource information is configured to indicate resource availability and resource assignment for connecting the backbone device with any one of said multiple access devices and any one of said multiple access devices with said relay device. According to the above-outlined second approach, said resource information is configured to indicate resource availability and resource assignment for connecting the backbone device with any one of said multiple access devices and any one of said multiple access devices other than the mother eNB, i.e. a dominant access device controlling said relay device, with said dominant access device and said dominant access device with said relay device. The thus set multiple links are shared for load balancing between said backbone device and said relay device via said multiple access devices. The data processing unit/function represents means for or an operation of, in the uplink (UL) direction, receiving data from said multiple access devices via said multiple links, coordinating the received data, re-sequencing the received data into a proper data sequence, and, in the downlink (DL) direction, scheduling and distributing data towards said relay device to said multiple access devices via said multiple links. Regarding the downlink (DL), there are two optional sub-means or sub-operations, as described above in connection with FIG. 5.

FIG. 9 shows a schematic diagram of functionality of a relay device according to embodiments of the present invention. The thus depicted apparatus may for example be implemented as or in a relay node, as mentioned above.

According to the exemplary embodiment depicted in FIG. 9, the thus depicted relay device comprises a (multiple connections) establishment unit/function, a resource information acquisition unit/function, a data processing unit/function. Optionally, it also comprises a links setting unit/function, a resource allocation management unit/function, a resource allocation monitoring unit/function, and a eNB measurement unit/function. Furthermore, the thus depicted relay device comprises an interface or port for one or more SX links towards access devices, i.e. eNBs, and an interface or port for one or more links toward user equipments or terminals.

Stated in general terms, the multiple connections establishment unit/function represents means for or an operation of establishing multiple connections between said relay device and a backbone device, e.g. a gateway or central network controller, of a backbone network via multiple access devices of said access network, said multiple connections including multiple links between said backbone device and said multiple access devices. The resource information acquisition unit/function represents means for or an operation of acquiring resource information of said multiple access devices, said resource information indicating resource availability and resource assignment of said multiple access devices for said multiple connections, and the data processing unit/function represents means for or an operation of processing data to and/or from said backbone device via said multiple connections in accordance with said resource information.

According to the above-outlined first approach, the links setting unit/function represents means for or an operation of setting multiple links between said relay device and said multiple access devices in accordance with said resource information, wherein said multiple connection establishing comprises connecting said relay device with any one of said multiple access devices via said multiple links and any one of said multiple access devices with said backbone device. The resource allocation management unit/function represents means for or an operation of managing resource allocation of said multiple links between said relay device and said multiple access devices in accordance with said resource information. In this instance, the data processing unit/function represents means for or an operation of, in the downlink (DL) direction, receiving data from said multiple access devices via said multiple links, coordinating the received data, re-sequencing the received data into a proper data sequence, and, in the uplink (UL) direction, scheduling and distributing data towards said backbone device to said multiple access devices via said multiple links.

According to the above-outlined second approach, no specific link setting between said relay device and a dominant access device of said multiple access devices is necessary, as such a links has usually already been established anyway. Said multiple connections establishing comprises connecting said relay device and said dominant access device via a (pre-established) single link and said dominant access device with said backbone device directly as well as indirectly via any one of the multiple access devices other than said dominant access device.

The functionality of the resource allocation monitoring unit/function and the eNB measurement unit/function is evident from the above description, e.g. in connection with FIGS. 5 and 7.

FIG. 10 shows a schematic diagram of functionality of an access device according to embodiments of the present invention. The thus depicted apparatus may for example be implemented as or in an access node, a radio base station or a eNB, as mentioned above. Such an apparatus may operate as a mother eNB, as mentioned above.

According to the exemplary embodiment depicted in FIG. 10, the thus depicted access device (e.g. a (mother) eNB) comprises a resource information obtaining unit/function, a (multiple connections) control unit/function, and a data processing unit/function. Optionally, it comprises a links setting request unit/function, a resource allocation management unit/function, a resource allocation monitoring unit/function, a mother role switching control unit/function, and a link load measurement control unit/function. Furthermore, the thus depicted access device comprises an interface or port for a S1 link towards the backbone network (e.g. a gateway or central network controller), an interface or port for a SX link towards a relay device, and an interface or port for one or more X2 links towards other access devices (i.e. eNBs).

Stated in general terms, the resource information obtaining unit/function represents means for or an operation of obtaining resource information of multiple access devices of said access network, i.e. the present eNB and one or more other eNBs being relevant for a relay device in question, said resource information indicating resource availability and resource assignment of said access device and at least one further access device of said access network for establishing multiple connections between a relay device of said access network and a backbone device of a backbone network via said multiple access devices. The (multiple connections) control unit/function represents means for or an operation of controlling said multiple connections between said relay device and said backbone device via said multiple access devices, said multiple connections including multiple links between said backbone device and said multiple access devices, and the data processing unit/function represents means for or an operation of processing data between said relay device and said backbone device via said multiple connections in accordance with said resource information.

According to the above-outlined first approach, the links setting request unit/function represents means for or an operation of requesting setting of multiple links between said relay device and said multiple access devices, and the connections control comprises connecting said relay device with any one of said multiple access devices via said multiple links and any one of said multiple access devices with said backbone device.

According to the above-outlined second approach, no specific link setting between said relay device and said access device is necessary, as such a links has usually already been established anyway. The connections control comprises connecting said relay device and said access device via a (pre-established) single link and said access device with said backbone device directly as well as indirectly via any one of the at least one further access device. In this instance, the resource management unit/functions represents means for or an operation of managing resource allocation of said multiple links between said backbone device and said multiple access devices in accordance with said resource information. In this instance, the data processing unit/function represents means for or an operation of, in the downlink (DL) direction, receiving data from said backbone device via said multiple links, coordinating the received data, re-sequencing the received data into a proper data sequence, and forwarding the re-sequenced data on said single link to said relay device, and, in the uplink direction, scheduling and distributing data towards said backbone device to said multiple links between said backbone device and said multiple access devices.

The resource information obtaining unit/function may be configured to query said multiple access devices for available resources, to assign available resources for said multiple connections, to generate said resource information on the basis of the resource availability and the resource assignment, and to send said resource information to said backbone device.

The link load measurement unit/function represents a means for or an operation of reporting the access device's load on the relay link, which information could then be used when the (dominant) access device decides to route the data via the different access devices. Thus, in the downlink (DL) direction, it may be ensured that the relay links of the individual access devices are not overloaded.

The functionality of the resource allocation monitoring unit/function and the mother role switching unit/function is evident from the above description, e.g. in connection with FIGS. 5 and 7.

Any one of the above-outlined apparatuses represents an autonomous entity according to respective embodiments of the present invention, while their interworking entirety or any conceivable combination thereof represents a system according to respective embodiments of the present invention.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Software in the sense of the present description comprises software code as such comprising code means for performing the respective functions, as well as software (or a computer program or a computer program product) embodied on a tangible medium such as a computer-readable storage medium having stored thereon a respective data structure or code portions or embodied in a signal or in a chip, potentially during processing thereof.

Generally, for the purpose of the present invention as described herein above, it should be noted that an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuits switched access technologies;

access technologies may be distinguishable in at least two categories or access domains such as packet switched and circuit switched, but the existence of more than two access domains does not impede the invention being applied thereto, an access network may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user may experience services from an access network such as a mobile phone, personal digital assistant PDA, or computer;

method steps and functions likely to be implemented as software code portions and being run using a processor at one of the entities, a network element, or a terminal (as examples of devices, apparatuses and/or modules thereof, or as examples of entities including apparatuses and/or modules therefore), are software code independent and can be specified using any known or future developed programming language, such as e.g. Java, C++, C, and Assembler, as long as the functionality defined by the method steps is preserved;

generally, any method step is suitable to be implemented as software or by hardware without changing the idea of the invention in terms of the functionality implemented;

method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for load balancing in relay-enhanced access networks with a relay device and multiple access devices, said measures exemplarily comprising the setting of multiple links between a backbone device of a backbone network and said multiple access devices, and a management of resource allocation of said multiple links between said backbone device and said multiple access devices in accordance with resource information of said multiple access devices indicating resource availability and resource assignment of said multiple access devices for establishing multiple connections between said backbone device and said relay device via said multiple access devices.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method performed at a relay device of an access network, comprising:
establishing, by said relay device, multiple connections for a bearer between said relay device and a core network device of a core network via multiple access devices of said access network, said multiple connections including multiple links between said core network device and said multiple access devices, said multiple connections further including multiple links directly established at the same time between said relay device and each said multiple access devices, and a single link between said relay device and a user equipment within said access network, wherein at least one air interface technology is used for communications within said access network and no other links exist in the access network from the user equipment for the bearer,
acquiring resource information of said multiple access devices, said resource information indicating resource availability and resource assignment of said multiple access devices for said multiple connections, where acquiring also acquires radio configuration information, and
processing data between said user equipment and said core network device via said multiple connections in accordance with said resource information.

2. The method according to claim 1, further comprising setting said multiple links between said relay device and said multiple access devices in accordance with said resource information, wherein said multiple connection establishing comprising connecting said relay device with any one of said multiple access devices via said multiple links and any one of said multiple access devices with said core network device.

3. The method according to claim 2, further comprising managing resource allocation of said multiple links between said relay device and said multiple access devices in accordance with said resource information.

4. The method according to claim 2, said data processing comprising at least one of receiving data from said multiple access devices via said multiple links, coordinating the received data, re-sequencing the received data into a proper data sequence, and scheduling and distributing data towards said core network device to said multiple access devices via said multiple links.

5. The method according to claim 2, said setting comprising any one of establishing, reconfiguring and releasing said multiple links.

6. The method according to claim 2, said multiple links being shared for load balancing between said relay device and said core network device via said multiple access devices.

7. The method according to claim 1, said multiple connection establishing comprising connecting said relay device and a dominant access device via a single link and said dominant access device with said core network device directly as well as indirectly via any one of the multiple access devices other than said dominant access device.

8. An apparatus of an access network comprising:
an establishing unit configured to establish multiple connections for a bearer between said apparatus and a core network device of a core network via multiple access devices of said access network, said multiple connections including multiple links directly established between said core network device and each said multiple access devices, said multiple connections further including multiple links at the same time between said apparatus and said multiple access devices, and a single link between said apparatus and a user equipment within said access network, wherein at least one air interface technology is used for communications within said access network and no other links exist in the access network from the user equipment for the bearer,
an acquiring unit configured to acquire resource information of said multiple access devices, said resource information indicating resource availability and resource assignment of said multiple access devices for said multiple connections, and radio configuration information for said apparatus, and
a data processing unit configured to process data between said user equipment and said core network device via said multiple connections in accordance with said resource information.

9. The apparatus according to claim 8, further comprising a setting unit configured to set said multiple links between said apparatus and said multiple access devices in accordance with said resource information, wherein said establishing unit is further configured to connect said apparatus with any one of said multiple access devices via said multiple links and any one of said multiple access devices with said core network device.

10. The apparatus according to claim 9, further comprising a resource managing unit configured to manage resource allocation of said multiple links between said apparatus and said multiple access devices in accordance with said resource information.

11. The apparatus according to claim 9, said data processing unit being further configured to at least one of receiving data from said multiple access devices via said multiple links, coordinating the received data, re-sequencing the received data into a proper data sequence, and scheduling and distributing data towards said core network device to said multiple access devices via said multiple links.

12. The apparatus according to claim 9, said multiple links being shared for load balancing between said apparatus and said core network device via said multiple access devices.

13. The apparatus according to claim 8, said establishing unit being further configured to connect said apparatus and a dominant access device via a single link and said dominant access device with said core network device directly as well as indirectly via any one of the multiple access devices other than said dominant access device.

14. The apparatus according to claim 8, said apparatus comprising at least a part of a relay device of an access network.

15. A non-transitory computer-readable medium that stores computer program instructions, where execution of the computer program instructions by at least one data processor results in execution of operations at a relay device of an access network, the operations comprising:

establishing multiple connections for a bearer between said relay device and a core network device of a core network via multiple access devices of said access network, said multiple connections including multiple links between said core network device and said multiple access devices, said multiple connections further including multiple links directly established at the same time between said relay device and each said multiple access devices, and a single link between said relay device and a user equipment within said access network, wherein at least one air interface technology is used for communications within said access network and no other links exist in the access network from the user equipment for the bearer, acquiring resource information of said multiple access devices, said resource information indicating resource availability and resource assignment of said multiple access devices for said multiple connections, where acquiring also acquires radio configuration information, and processing data between said user equipment and said core network device via said multiple connections in accordance with said resource information.

\* \* \* \* \*